(12) United States Patent
Shwe et al.

(10) Patent No.: US 6,560,590 B1
(45) Date of Patent: May 6, 2003

(54) METHOD AND APPARATUS FOR MULTIPLE TIERED MATCHING OF NATURAL LANGUAGE QUERIES TO POSITIONS IN A TEXT CORPUS

(75) Inventors: Michael Shwe, San Francisco, CA (US); Brian O'Neill, San Francisco, CA (US)

(73) Assignee: Kana Software, Inc., Menlo Park, CA (US)

( * ) Notice: Subject to any disclaimer, the term of this patent is extended or adjusted under 35 U.S.C. 154(b) by 0 days.

(21) Appl. No.: 09/503,983

(22) Filed: Feb. 14, 2000

(51) Int. Cl.[7] .................................................. G06N 7/00
(52) U.S. Cl. ............................................. 706/55; 707/2
(58) Field of Search .............................. 706/55, 45, 46; 707/2

(56) References Cited

U.S. PATENT DOCUMENTS 5,404,295 A  4/1995  Katz et al. ..................... 707/2

OTHER PUBLICATIONS

Gerard Sabah et al; Carmel: A Step Toward Reflection in Natural Language Understanding Systems; Nov. 1993; IEEE; 1063–6730/93; 258–265.*

* cited by examiner

Primary Examiner—Wilbert L. Starks, Jr.
Assistant Examiner—Joseph P. Hirl
(74) Attorney, Agent, or Firm—Dag Johansen; Stattler Johnson & Adeli LLP (57) ABSTRACT

A multi-tiered system for responding to natural language queries is using disclosed. The query resolution system returns zero or more links to content that is relevant to the users query. The present invention for query resolution combines two or more types of natural language query resolution methods, where the knowledge base for each of the methods comes from a single knowledge specification. The various different natural language query resolution methods differ fundamentally in how they match the user query to the web site content. The results of the resolution methods are ranked and all, some, or none of the results of each system may be displayed.

26 Claims, 6 Drawing Sheets

<answer> = /0.7/ <How_do_I_get_paid_to_surf_the_web> {ActionTag1} | /0.3/ <How_does_eStore_make_money> > {ActionTag2};

<How_do_I_get_paid_to_surf_the_web> = <How_do_I> /0.9/ <get_paid> /0.2/ <to_surf_the_web>;

<How_does_eStore_make_money> = How does <eStore> / 0.85/ <get_paid> ;

<get_paid> = /0.7/ get <paid> | /0.3/ make <money>;

<money> = /0.2/ cash | /0.6/ money | /0.2/ dollars;

<paid> = /0.8/ paid | /0.1/ reimbursed | /0.1/ rewarded;

<to_surf_the_web> = to /0.9/ <surf> <article> /0.8/ <web>;

<article> = /0.33/ a | /0.33/ the | /0.33/ an;

<web> = /0.25/ internet | /0.25/ world wide web | /0.25/ web | /0.25/ www;

<surf> = /0.5/ surf | /0.1/ browse | /0.1/ view | /0.3/ look at;

<How_do_I> = /0.6/ how do I | /0.4/ can I;

<eStore> = eStore | you | your company | you guys;

Figure 3

P(<paid> | <get_paid>)

<get_paid>

|  |  | Get <paid> | Make <money> | absent |
|---|---|---|---|---|
| <paid> | paid | 0.8 | 0.0 | 0.001 |
|  | reimbursed | 0.1 | 0.0 | 0.001 |
|  | rewarded | 0.1 | 0.0 | 0.001 |
|  | absent | 0 | 1.0 | 0.997 |

P(<get_paid1> | <get_paid>)

<get_paid>

|  |  | present | absent |
|---|---|---|---|
| <get_paid1> | Get <paid> | 0.7 | 0.001 |
|  | Make <money> | 0.3 | 0.001 |
|  | absent | 0.0 | 0.998 |

P(<get_paid> | <How_do_I_get_paid_to_surf_the_web>, <How_does_eStore_make_money>)

|  |  | present | present | absent | absent | <How_do_I_get_paid_to_surf_the_web> |
|---|---|---|---|---|---|---|
| <get_paid> |  | present | absent | present | absent | <How_does_eStore_make_money> |
|  | present | 0.995 | 0.9 | 0.85 | 0.001 |  |
|  | absent | 0.005 | 0.1 | 0.15 | 0.999 |  |

METHOD AND APPARATUS FOR MULTIPLE TIERED MATCHING OF NATURAL LANGUAGE QUERIES TO POSITIONS IN A TEXT CORPUS

FIELD OF THE INVENTION

The present invention relates to the field of human-computer interaction using natural language. In particular, the present invention discloses methods of using a multiple tiered approach to matching a human's natural language query to elements of a corpus of information, in order present the user with relevant sections of information from the corpus.

BACKGROUND OF THE INVENTION

The Internet evolved during the late $20^{th}$ century to a vast infrastructure of communication that affords billions of people with nearly instant access to millions of World Wide Web sites. Large numbers of commercial Webs sites that sell products and services have blossomed to take advantage of this new communication medium. These Internet-based commercial web sites are often referred to as "ecommerce" sites. Many large ecommerce sites on the Web receive tens of thousands of customer inquiries each day.

The ecommerce companies receive customer inquiries through multiple different transport channels on the Internet including email, web forms, and chat or other real-time interactions with a human customer service agent. To keep their customers happy, these ecommerce sites need efficient systems for responding to these voluminous customer inquiries. To provide simple automated customer support many ecommerce sites provide a search engine to the users. A search engine accepts a set of designated keywords and uses those keywords to locate information related to the keywords.

To provide a simple customer response system, many ecommerce Web sites now offer "free-text interactions" across the Internet. Free-text interactions allow a user to enter a multiple word query in the form of a question or command that is handled automatically by a query resolution system running on a computer system. Free-text interactions often involve referring the user to a certain section of the web site or a certain part of the web site containing a pre-defined set of "Frequently Asked Questions" and answers. The frequently asked questions and answers are commonly referred to as an FAQ. Based on the degree of the best match for the multiple word query, the user may be presented with a set of hyperlinks for destinations on the web site. These destinations may include one or more sections of the FAQ. Alternatively, the user might be presented with a customized web page that contains the relevant FAQ entries in it.

A typical search engine allows a user to enter a small number of keywords as search terms that will be searched for in a target database such as the ecommerce web site. Alternatively, a search engine may be used to handle free-text queries, where selected words from the free-text query are matched against an indexed form of a corpus under examination. To select words in the free-text query for matching, a search engine might select all words besides those considered as "stop words." Stop words are words that occur often in language and do not convey much information in and of themselves. In the English language, stop words include common prepositions, articles, and conjunctions. For example, "on," "above", "in," "and", "the" are usually considered stop words.

To simplify human and computer interaction at an automated web site, many web site designers have decided to anthropomorphize the search engine of a web site with a computer-based agent. In this manner, the users will interact with the agent as if the agent had the intelligence or verbal communication skills of a human being. In these human-computer interactions with the agent, the customer may be encouraged by the web site to ask a question in its natural form. For example, the site may present the user with a one-line text box with the prompt: "Please ask a question, such as "What does your company do?'."

Unfortunately, customers may ask questions that the natural language query facility misinterprets and thus does not provide meaningful results. For example, if a natural language query facility strips out the stop words of "What does your company do?" and applies the keywords to a search engine, the search engine will not likely be able to provide meaningful results. One reason this may occur is that the question "What does your company do" does not contain a set of words that conveys the overall meaning of the query the stop words have been removed. For example, the stop word removal system of one embodiment leaves only the word "company". It is unlikely that a search of the web site's content for the word "company" will provide meaningful results to the original question. In fact, it is likely that the search engine will return a plethora of irrelevant results.

Natural language query systems on the World Wide Web have proven to be quite popular with the general public. However, the current implementations of natural language query systems often yield inaccurate or limited results. It would therefore be desirable to have improved natural language query systems that provide improved results.

SUMMARY OF THE INVENTION

A system for matching natural language queries to web site content is disclosed. The query resolution system returns zero or more links to content that is relevant to the users query. The present invention for query resolution combines two or more types of natural language query resolution methods, where the knowledge base for each of the methods comes from a single knowledge specification.

The various different natural language query resolution methods differ fundamentally in how they match the user query to the web site content. The results of the resolution methods are ranked and all, some, or none of the results of each system may be displayed.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and apparatus for implementing a multiple-tiered system for resolving natural language queries is disclosed. In the following description, for purposes of explanation, specific nomenclature is set forth to provide a thorough understanding of the present invention. However, it will be apparent to one skilled in the art that these specific details are not required in order to practice the present invention. Furthermore, the present invention has been disclosed with reference to specific embodiments. For example, the present invention will be disclosed with reference to an embodiment wherein a user interacts with a web site using natural language. However, many variant embodiments can be created using the same techniques. For example, an alternative embodiment may interact with a users natural language query received via email or over telephone.

Overview of a Multi-tiered Natural Language Query Processing System

To provide an efficient and accurate natural language processing system, the present invention introduces a dynamically adjustable multi-tiered natural language processing system. The multi-tiered natural language processing system of the present invention selects one or more natural language processing systems from a set of multiple different natural language processing systems in order to evaluate a particular natural language query. The selection is performed using metalevel reasoning systems that estimate the expected results of each different natural language processing system.

Figure 1A:
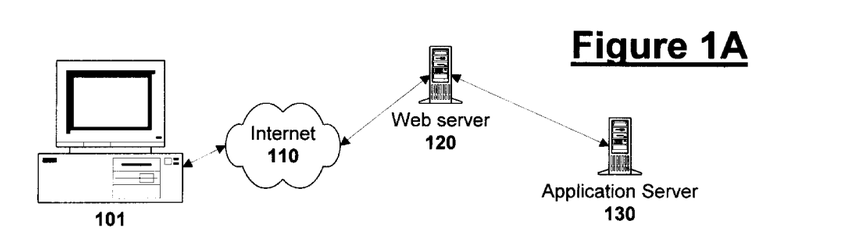
FIG. 1A illustrates a typical computer environment that may use the query resolution teachings of the present invention, in the context of web-based self-service.

FIG. 1A illustrates a block diagram of web-based natural language query resolution system that may incorporate the teachings of the present invention. Referring to FIG. 1A, a user interacts with the web site on a web server 120 using a web browser on a personal computer 101. The personal computer 101 may communicate with the web server 120 across the global Internet 110. However, it should be noted that any type of communication link might be used including an intranet, a direction connection, or a proprietary data connection. Typically, the personal computer 101 communicates with the web server 120 using the HyperText Transport Protocol (HTTP), although any other protocol may be used.

Web server 120 may present the user with a web page that allows a user to enter a natural language query in order to search for desired information. When the user enters a natural language query into the web page displayed on his personal computer 101, the personal computer 101 may use an HTTP "POST" command to return the user's natural language query to the web server 120.

Most web servers are not equipped to perform complex processing of user information. Thus, the web server 120 may communicate the natural language query to an application server 130 to have a special application on the application server process the natural language query. The web server can use any type of standard or proprietary protocol to send the natural language query to the application server 130.

Figure 1B:
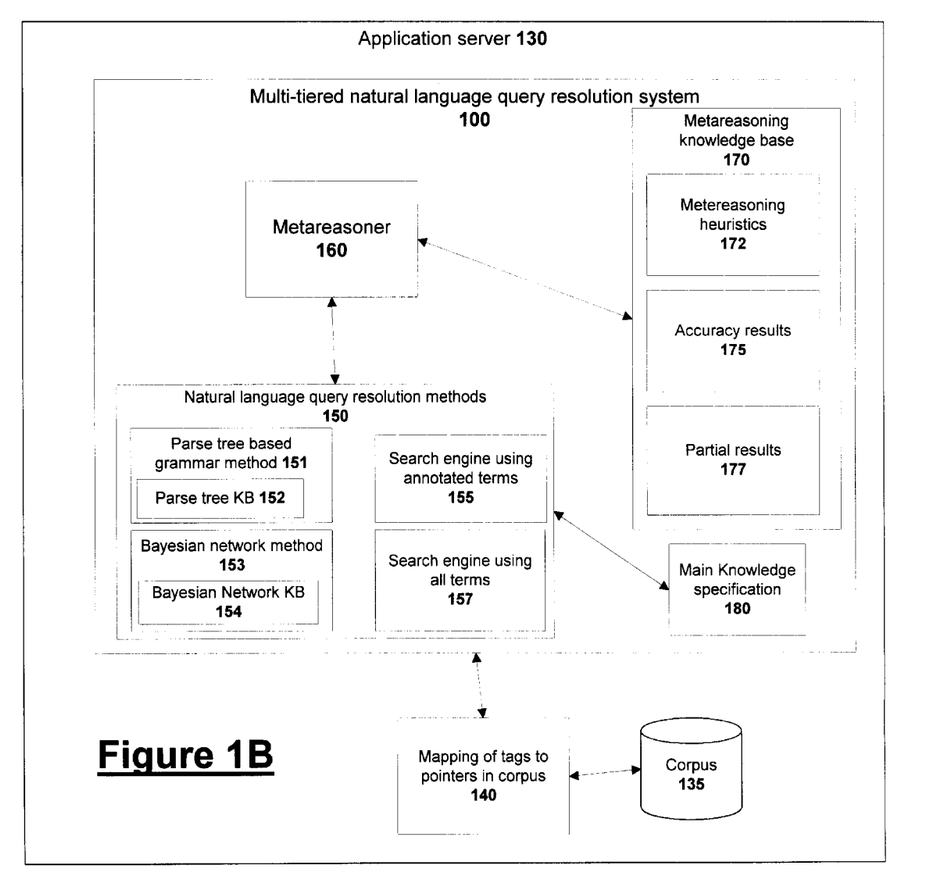
FIG. 1B illustrates a block diagram of one embodiment of a Multi-tiered natural language query resolution system created using the teachings of the present invention.

The teachings of the present invention may be implemented within the multi-tiered natural language query processing system 100 illustrated in FIG. 1B that runs on the application server 130 of FIG. 1A. Referring to FIG. 1B, the multi-tiered natural language query processing system 100 processes natural language queries to generate a set of desired results. In one embodiment, the multi-tiered natural language query processing system 100 processes the natural language query in order to locate relevant sections of information from a corpus 135. The corpus 135 may comprise a text file. In such an embodiment, the multi-tiered natural language query processing system 100 may return a set of pointers to sections of text the text corpus 135 under examination. In one embodiment, these pointers may comprise a set of hyperlinks and bookmarks to sections of text from the text corpus 135. A relevant excerpt of the text may accompany the returned hyperlinks such that the excerpt of text may be placed immediately before or after the hyperlink reference in order to provide the user with a preview of the information.

Figure 2A:
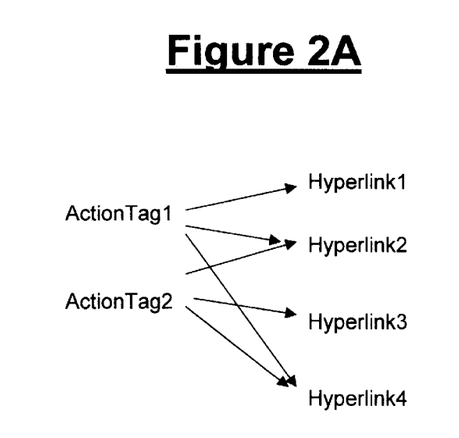
FIG. 2A illustrates a set of tags and associated links.

In one embodiment, the corpus 135 consists of general pages on the web site and specifically designated "frequently asked questions" (FAQ) web pages. Furthermore, one embodiment of the present invention maintains a set of many-to-many mapping 140 of tags to pointers in the corpus 135. Each tag may correspond to a plurality of pointers, and any pointer may be mapped to a plurality of tags. For example, FIG. 2A illustrates ActionTag1 that corresponds to Hyperlink1, Hyperlink2, and Hyperlink4. Furthermore, FIG. 2A illustrates ActionTag2 that corresponds to Article2, Article3, and Article4. This many-to-many mapping allows the invention to represent the relationship that one question or concept might be related to multiple hyperlink destinations, and one hyperlink destination might be related to more than one question.

In order to determine which tags to return, the multi-tiered natural language query processing system 100 of the present invention uses a plurality of different natural language query resolution methods 150 such as grammar based parse tree 151, Bayesian Network 153, a search engine using annotated terms 155, and an all-term search engine 157. Furthermore, the multi-tiered natural language query processing system 100 utilizes a metareasoner 160 in order to determine which natural language query resolution methods 150 should be called and the order in which the natural language query resolution methods 150 should be called.

It is often advantageous to call only a subset of the available natural language query resolution methods 150 due to environmental conditions that may exist. For example, users may have an expectation for a quick response such that if the current load of the application server is high then only a subset of natural language query resolution methods 150 should be used to provide a quick response. Thus, the metareasoner 160 may track the server load to determine the amount of computing resources available to invoke a natural language query resolution methods. Many other factors may be considered by the metareasoner 160 to determine which natural language query resolution methods to invoke.

The metareasoner 160 may also dynamically determine the invocation order of the natural language query resolution methods 150. Such a determination may be made once initially or after each natural language query resolution method invocation. The metareasoner 160 uses the metareasoning knowledge base 170 to determine determining the order of natural language query resolution methods to invoke.

One type of knowledge in the metareasoning knowledge base 170 is the metareasoning heuristics module 172. Any number of heuristics or other quickly computed strategies could be invoked. For example, one heuristic that the metareasoning heuristic module 172 might employ is that only a short query should be attempted by the grammar. Another metareasoning heuristic that may be employed is that queries with multiple independent clauses should not be processed by the grammar-based method if multiple independent clauses are not modeled in the grammar. Such queries with multiple independent clauses should be processed first by the Bayesian network. For example, if the grammar based method is known to only handle single questions at a time such as "When was your company funded?" then a heuristic would be to look for queries with multiple question marks or periods. This type of logic can be codified in any number of ways, including procedural programming languages such as Java.

In a preferred embodiment, the metareasoning knowledge base 170 further comprises an Accuracy Results module 175. The Accuracy Results module 175 computes and stores recall and precision for each natural language query resolution method. For the task of retrieving relevant FAQ entries, recall is defined as the number of relevant FAQ entries returned by a natural language query resolution method divided by the number of relevant FAQ entries that should have been returned. Precision is the number of relevant FAQ entries returned, divided by the total number of FAQ entries returned. Recall and precision are standard metrics used in the field of information retrieval.

The Accuracy Results module 175 computes recall and precision using data from previous natural language inquiries. For a certain subset of previous queries that have been answered by the invention, either an administrative agent or the author of the query himself can record whether the answers provided were correct. With this information, the Accuracy Results module 175 can acquire and store the necessary information in order to assign recall and precision values to each natural language query method. Details for computing recall and precision will be obvious to one skilled in the art.

If actual statistics on recall and precision are not available, possibly because the invention has been recently installed, approximations of the recall and precision can be used until the system has answered enough queries to generate a proper sample. One skilled in the art will have a sense for the relative differences in recall and precision between different query resolution modes. For example, recall increases while precision decreases when the query resolution method shifts from the grammar 151, to the Bayesian network 153, to the search engine with annotated terms 155, to the search engine with all terms 157. Whether the recall and precision values are computed from actual statistics or estimated, the recall and precision values can be used as "expected" recall and precision values in the Accuracy results module 175. In any situation, the best-known approximations of the recall and precision values should be used in the present invention.

By computing or retrieving an expected recall and an expected precision as previously set forth, the metareasoner 160 may select the natural language query resolution methods 150 to invoke and the order in which they should be invoked. The metareasoner 160 may also consider a large number of other factors including expected time of computation, resources available, and desired accuracy. These factors may be combined with the expected recall and expected precision. In a preferred embodiment, the present invention orders the invocation of the natural language query resolution methods 150 by their expected precision. Typically, there is a tradeoff between precision and recall in information retrieval. In one embodiment, the present invention first attempts the natural language query resolution method with the highest expected precision. If this first natural language query resolution method invocation does not return a sufficient number of documents, the metareasoner 160 may then invoke the next query resolution method.

The ordering of query resolution methods may change based on the results of the methods already invoked. For example, if a search engine method using annotated words returned a large number of results with low precision then the metareasoner may select to next invoke the Bayesian network method 151 instead of the all term search engine based methods 155 that will likely produce even less precise results. Furthermore, any number of other measurements can be used to determine the natural language query resolution method invocation ordering. For example, if the first invoked natural language query resolution method returns no results, and computation time is limited, then the metareasoner 160 can then immediately invoke a subsequent natural language query resolution method that favors recall over precision with minimal computation time in order to generate quickly a large number of results.

Individual Methods for Processing Natural Language Queries

As previously set forth, many different types of natural language query resolution methods may be used by the present invention. A summary of a few of the different natural language query processing systems that may be used is presented below. However, this list is not exhaustive as other natural language query resolution methods may also be used in the system of the present invention.

Grammar Based Matching Systems

Grammar-based matching schemes are commonly used for speech recognition and interactive voice response applications in order to recognize exactly which words the user said. Typically, the grammar is expressed as a context-free grammar, since there exist efficient parsers for this class of grammars, and there do not exist efficient parsers for grammars that are not context-free. Grammar based parsers typically exhibit extremely high precision at the expense of recall. In other words, when grammar-based parsers return a match, that match will usually be correct. However, grammar-based parsers are susceptible to failing to find a match for queries that seem similar to patterns that have been entered in the grammar since such parsers can be intolerant of unanticipated query constructions. For example, a query such as "How do I return my product" might match the grammar, while a query with the same meaning "How do I go about doing a return on a product that I recently received" might not match the grammar.

Feature Based Matching Systems

An alternative to the grammar-based matching method is to use any number of feature-based pattern matching methods, such as neural networks or Bayesian networks. These types of methods are often referred to as uncertainty based reasoning systems. To use these feature-based methods, the natural language query must be transformed into a set of features. Often, these features are based on the individual words themselves or at a higher lexical level. Lexical analysis of the query may involve elimination of stop words or other commonly occurring words. Lexical analysis of the query may also involve extracting phrases from the query. Phrases can be identified ahead of time by analyzing an archive of queries that have been processed by the present invention. Any number of methods can be used to identify phrases automatically, as one skilled in the art will recognize. The features generated after lexical analysis such as stop word elimination as phrase identification can be used as inputs to a fuzzy pattern-matching algorithm. This method is commonly referred to as the "bag of words" approach in text classification.

Search Systems Using Domain-specific Keywords

A search system based on domain-specific keywords combines a search engine with a pre-defined, domain-specific lexicon of terms that will be used. The domain-specific lexicon can be created automatically or manually. The lexicon will have terms that arc typically used in the discourse of the domain, particularly those that have informational value. For example, in the application domain of on-line brokerage, the terms "stock," "bond," "IRA," and "account balance" would be likely terms. In the same application domain, most stop words and words such as "company" or "blue" would likely not be in the lexicon. The use of a domain-specific lexicon with a search engine, instead of allowing all words to be used as search terms in a search engine will tend to increase precision of returned results, while lowering recall. Any number of commercially available search engines may be used for this task.

Search Systems Using All Words

An search system using all words attempts to located sections of text from the corpus that include all the keywords in a natural language query after the stop words have been removed. Standardized lists of stop words are available on the Internet. These lists include words that typically carry little information on their own merit. Examples of the words include "and," "but", "my", "for", "because", and "the". A search system may instead include in the search terms all words except for stop words and introductory question fragments, such as "What are . . ." and "How do I . . ." Some search engines will return a higher score for a document that contains a phrase that matches a phrase of two or more words in the query list. For example, "How do I get paid to surf the web" will invoke high scores from documents that contain the phrase "paid surf web", which results after the introductory question fragment and stop words are removed from the query. An all term keyword search system may use a conjunction of search terms or a disjunction. Using a conjunction of search terms (a logical "AND" of the terms) will lead to lower recall and higher precision, while a disjunction of search terms (a logical "OR" of the terms) will lead to higher recall but much lower precision. As with the search system using a domain-specific lexicon, any number of commercially available search engines may be used for this task.

Individual Natural Language Query Processing Knowledge Bases

As set forth in the previous section, the present invention may use several different types of natural language query processing methods to process natural language queries. Many different natural language query-processing methods use a knowledge base during the natural language processing. For implementation efficiency, one embodiment of the present invention employs a single main knowledge representation to generate a plurality of individual knowledge bases for the plurality of natural language query resolution methods. FIG. 1 illustrates the single main knowledge specification 180. In a preferred embodiment, the present invention uses an extension of a regular grammar as the single main knowledge representation 180. Regular grammars are a proper subset of context free grammars.

The grammar in the single main knowledge representation 180 can be physically formatted in any number of ways. In one embodiment, the grammar is formatted using the Java™ Speech Grammar Format from Sun Microsystems of Mountain View, Calif. The Java™ Speech Grammar For mat (JSGF) is a platform-independent, vendor-independent textual representation of grammars for use in speech recognition. In an alternative embodiment, the single main knowledge representation 180 can be formatted using the eXtensible Markup Language commonly referred to as XML.

In a preferred embodiment, the single main knowledge representation 180 is compiled into a parse tree 152 to generate one of the plurality of knowledge bases from the knowledge representation. Specifically, a parse tree 152 is used for a grammar based natural language query processing method 151. The grammar may be supplemented with probabilities in order to generate a Bayesian network from the grammar. However, probabilities are not required if the grammar is supplemented with annotations of important features.

Figure 2B:
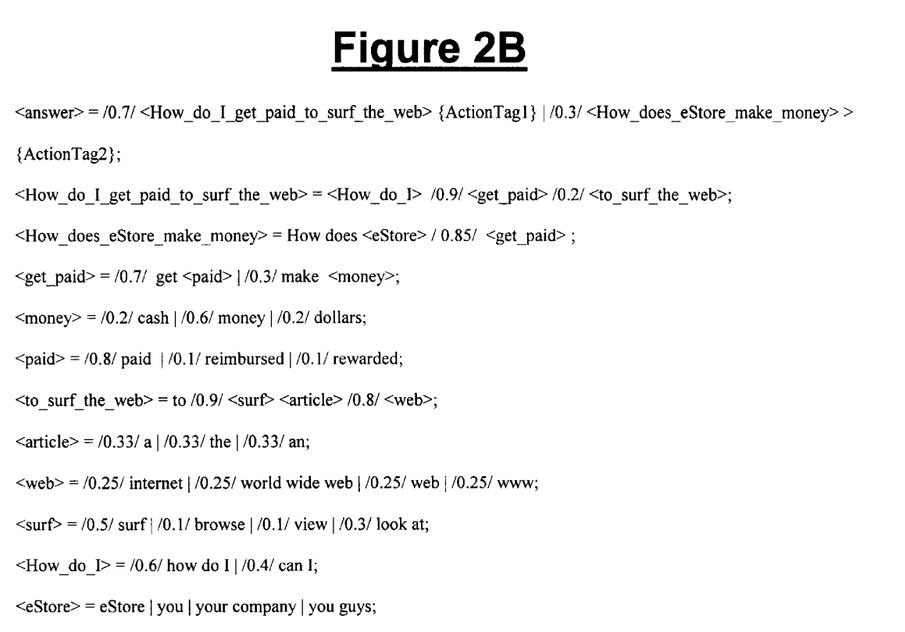
FIG. 2B illustrates a regular grammar that is a proper subset of the class of context free grammars.

Consider the grammar example in FIG. 2B that is formatted according to the Java Speech Grammar Format. The nonterminal expressions <How_do_I_get_paid_to_surf_the_web> and <How_does_eStore_make_money> are the nonterminals of interest: if a parse of an incoming query matches one of these, then we wish to take the action as specified in the respective action tags. For example, if a user enters "How do I get rewarded for surfing the Internet", the grammar parser will match the nonterminal <How_do_I_get_aid_to_surf_the_web> and return the tag Action-Tag1.

The present invention generates a plurality of knowledge bases (KBs) for various natural language query processing methods from a single main knowledge specification 180 to create a plurality of natural language query resolution methods. In a preferred embodiment, the present invention generates both a parse tree knowledge base (KB) 152 and Bayesian network knowledge base (KB) 154 from the single main knowledge specification 180.

Methods of generating a parse tree knowledge base from a regular grammar are well known. On example of a method for generating a parse tree knowledge base from regular grammar can be found in introductory texts such as Chapter 4 of Crafting a Compiler, by Charles N. Fischer and Richard LeBlanc, 1991.

In a preferred embodiment, the invention also generates a Bayesian knowledge base 152 for the Bayesian network 151 from the single main knowledge specification 180. A Bayesian network knowledge base 152 is a directed acyclic graph, where nodes represent random variables, and directed arcs represent probability distributions of the probability of the states of the child node given the state of the parent node. The probability distributions may be either continuous or discrete. The absence of an arcs between any two nodes denotes an assumption of conditional independence. In a preferred embodiment of the present invention, the distributions are discrete. Nonetheless, one skilled in the art will note that the teachings of the invention can be similarly applied to continuous probability distributions.

Bayesian Network Generation Using Rule Expansion

Figure 3:
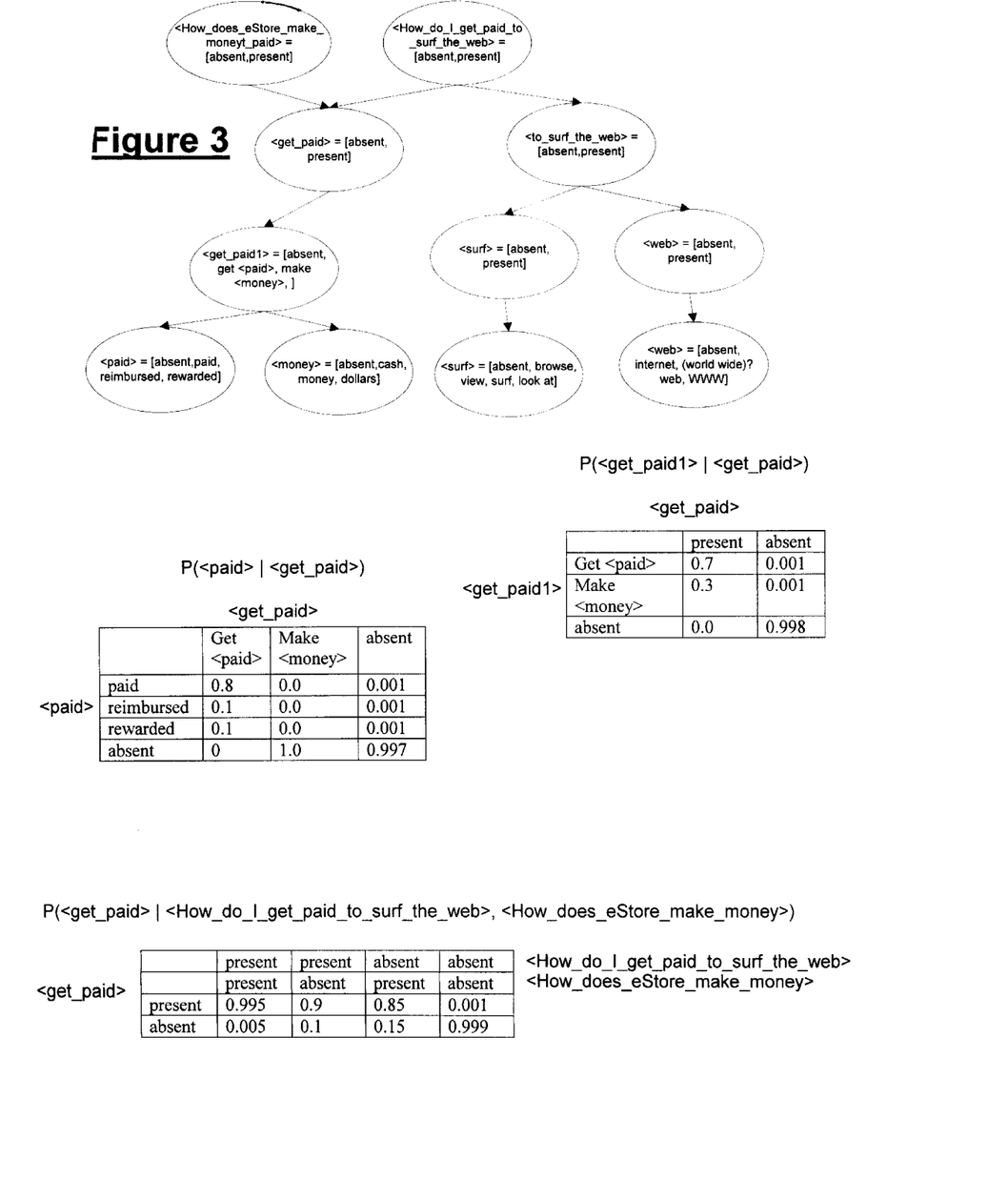
FIG. 3 illustrates a Bayesian network created from the grammar of FIG. 2B.

From the example main knowledge base grammar in FIG. 2B, the present invention may generate the knowledge base for the Bayesian network illustrated in FIG. 3. The algorithm to generate the Bayesian network from the grammar is straightforward.

Figure 4A:
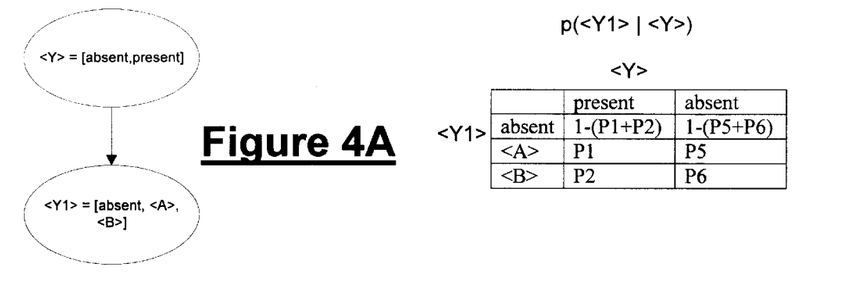
FIG. 4A illustrates a first generated local network structure for the Bayesian network of FIG. 3.

A rule expansion of the form:

<Y>=/p1/<A>{leak=p5}|/p2/<B>{leak=p6};

generates the local network structure in FIG. 4A. Note that the leak probabilities need to be specified in order to represent a nonzero value for the probability of the events that <A> or <B> occur without any modeled influence occurring. In other words, for example, <A> might occur in a natural language query with a probability of p5 even if none of the parents of <A> is present.

A rule expansion of the form

Figure 4B:
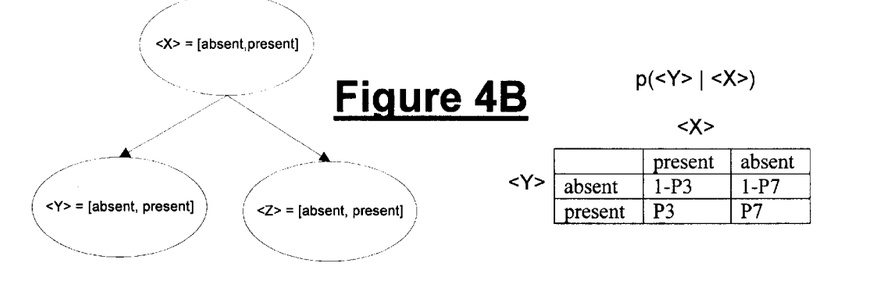
FIG. 4B illustrates a second generated local network structure for the Bayesian network of FIG. 3.
Figure 4C:
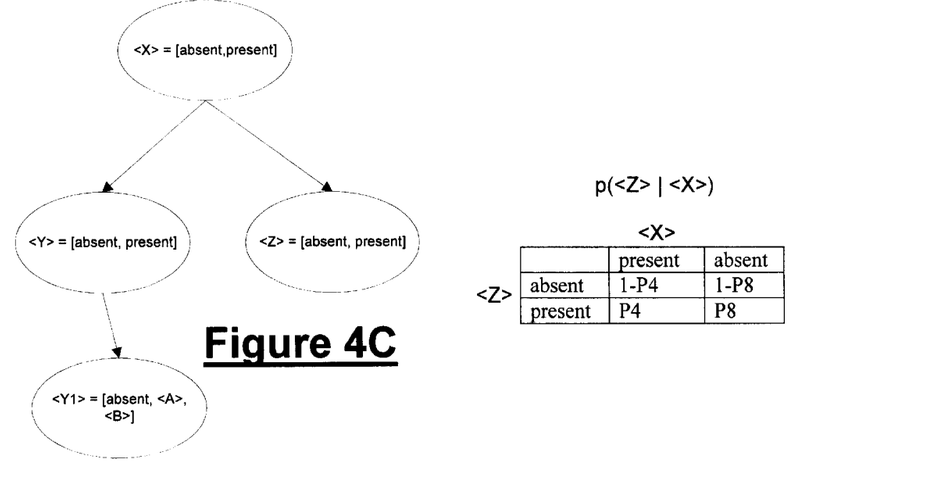
FIG. 4C illustrates a third generated local network structure for the Bayesian network of FIG. 3.

<X>=/p3/{lack=p7}<Y><D>/p4/{leak=p8}<Z>;

generates the local network structure in FIG. 4B. Combining these two examples, a set of rule expansions of the form:

<X>=/p3/{leak=p7}<Y><D>/p4/{leak=p8}<Z>;

<Y>=/p1/<A>{leak=p5}/p2/<B>{leak=p6 };

generates the local network structure in FIG. 4C. The local network structure in FIG. 4C is simply the graph union of the local network structures in FIGS. 4A and 4B. The conditional probability distributions in FIG. 4C are exactly the same as those in FIGS. 4A and 4B.

Figure 5A:
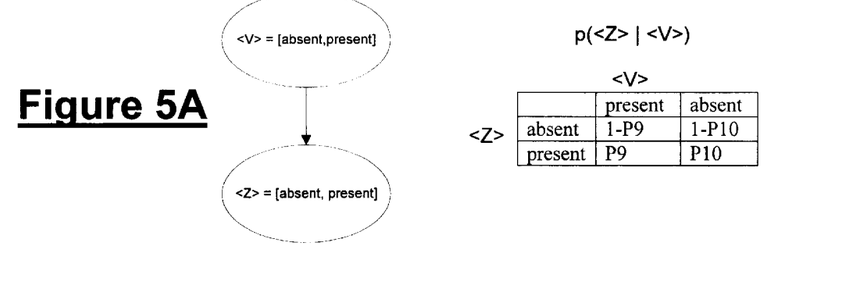
FIG. 5A illustrates a third generated local network structure for the Bayesian network of FIG. 3.

For the rule expansion below, the present invention generates the local Bayesian network structure in FIG. 5A.

<V>=/p9/{leak=p10}<Z><G>;

For the rule expansion below, the present invention generates the local Bayesian network structure of FIG. 5B.

Figure 5B:
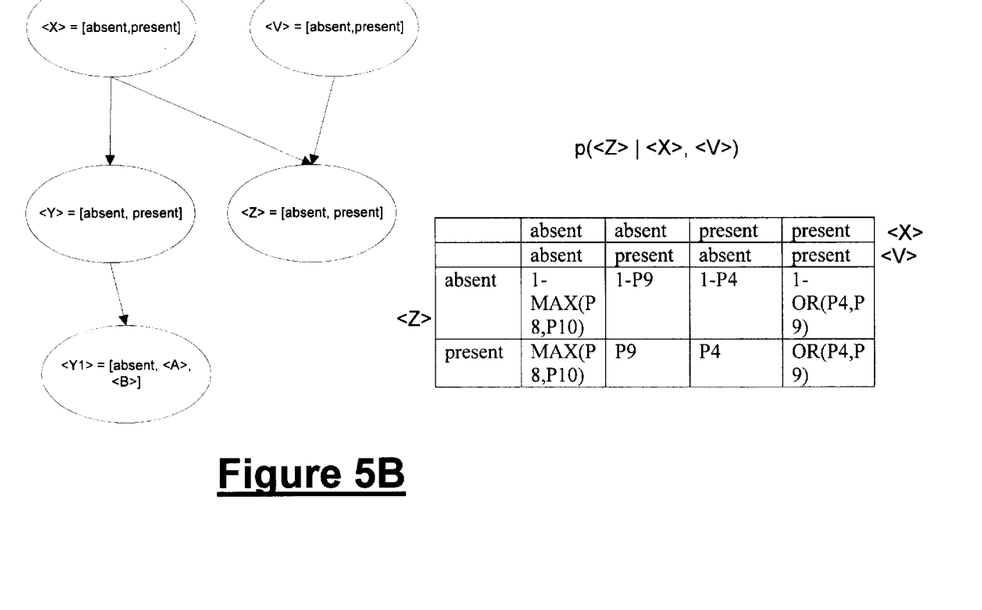
FIG. 5B illustrates a third generated local network structure for the Bayesian network of FIG. 3.

<X>=/p3/{leak=p7}<Y><D>/p4/{leak=p8}<Z>;

<Y>=/p1/<A>{leak=p}|/p2/<B>{leak=p6};

<V>=/p9/{leak=p10}<Z><G>;

Again, the graph union of the local structures in 4A, 4B, and 5A generates the Bayesian network structure of FIG. 5B. Where there are multiple parents of a single node arising from different rule expansions, the present invention uses a combination function to merge probability distributions. For example, the parents <V> and <X> appear on the left hand side of rule expansions, both of which yield a local structure with <Z> as a child node. In FIG. 5B, the conditional probability table depicts P(<Z>=present|<V>=<present>, <X>=present)=1−OR(P4, P9). Here, the OR function is the standard noisy-OR combination function, where $$OR(p_1 \ldots p_n) = 1 - \prod_{i=1}^{n}(1-p_i)$$

Any number of combination functions can be used in the present invention. The noisy-OR can be used, or a simple MAX function can be used, as in the combination of the leak probabilities P8 and P10.

More generally, to generate the Bayesian network corresponding to n rule expansions in a grammar, the present invention assembles the graph union of the local network structures corresponding to each of the n rule expansions. Where necessary, the present invention merges probability distributions using standard combination functions.

The present invention uses a default leak probability, which can be set any arbitrary value. This leak probability is used whenever a leak is necessary in the conditional probability tables of the Bayesian network being generated, but there does not explicitly appear a leak probability in the JSGF file. In the example in FIG. 2B, a default leak of p=0.001 for the non-absent states of a node is used. To generate the network in FIG. 3 from the grammar in FIG. 2B, the present invention uses a MAX function for combining leak values and a noisy-OR for combining probabilities of non-absent states of nodes. These combination functions were used by the invention to compute the conditional probability distribution of <get_paid> given the states of it parents.

Bayesian Network Generation From Annotated Features

A simple method of generating a Bayesian network from a simple grammar is to assign probabilities to the features that are used to build a terminal expression. For example, the non terminal expression <How_do_I_get_paid_to_surf_the_web> is made up of the following features:

<How_do_I>

<get_paid>

<to_surf_the_web>

To build a Bayesian network, those desirable features must be annotated. Once a set of annotated features has been established, a set of probabilities may be automatically assigned.

Using The Generated Bayesian Network

To use a Bayesian network that the present invention generates, the invention instantiates or sets the values of nodes in the network corresponding to words that are found in the natural language query. For example, "How do I get rewarded to surf the Internet?" would set the value of the following nodes:

<paid> is set to "rewarded"

<surf> is set to "surf"

<web> is set to "internet"

After these nodes are set to their values, the invention propagates the effects of this evidence through the Bayesian network using standard Bayesian network inference methods. The invention thereby ascertains marginal probabilities on the nodes of interest.

In the example in FIG. 3, the probabilities of interest are:

(<How_do_I_get_paid_to_surf_the__=present|query)

(<How_does_eStore_get_paid>=present|query)

In a natural language query processing method consisting of the search engine using a domain-specific keywords, the present invention uses a search engine in order to match selected terms from the natural language query to an indexed form of the corpus 135. To increase the precision of the search, the invention limits the search terms to be the intersection of terms in the natural language query with terms corresponding to child nodes in the Bayesian network knowledge base. For example, the terms corresponding to child nodes in the Bayesian network in FIG. 3 are: paid, reimbursed, rewarded, cash, money, dollars, browse, view, surf, look at, world wide web, web, internet, and www.

Metareasoning Processing

The present invention can employ either a static or dynamic ordering for invoking query resolution methods. In a static ordering, the invocation of the various natural language query resolution methods are ordered by decreasing levels of expected precision. For the query resolution methods of a preferred embodiment, this ordering would be: the parse tree based grammar method 151, the Bayesian network method 153, the annotated term search engine method 155, and the all term search engine method 157.

In a dynamic ordering, the metareasoner 160 revises the ordering based on the results of each successive invocation and available computational resources. For example, if the Bayesian network method 151 returns an empty set of tags and computational time is limited then the metareasoner 160 can skip the annotated terms search engine query resolution method 155 and invoke the all term keyword search engine method 157. Calling the all term keyword search engine method 157 instead of the annotated terms search engine query resolution method 155 sacrifices precision in favor of higher recall.

One Metareasoner Embodiment

Figure 6:
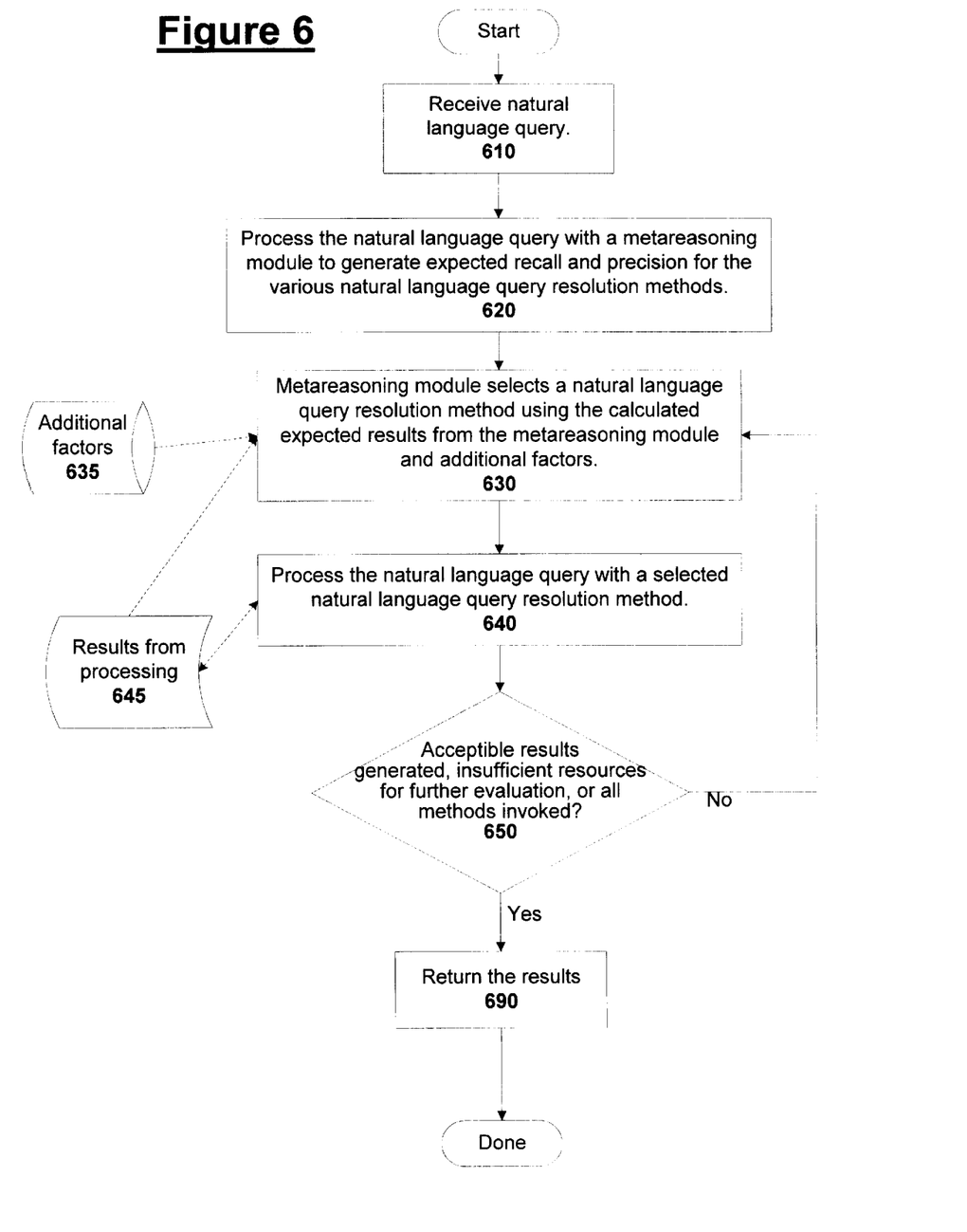
FIG. 6 illustrates a flow diagram describing the operation of one embodiment of multi-tiered natural language query resolution system of the present invention.

FIG. 6 illustrates a flow diagram that describes the operation of one embodiment of a dynamic ordering multi-tiered natural language query processing system. Referring to FIG. 6, the multi-tiered natural language query processing system first receives a natural language query at step 610. The multi-tiered natural language query processing system then processes the natural language query using the metareasoning knowledge base 170 to generate expected recall and precision values at step 620.

At step 630, the metareasoner 160 of the multi-tiered natural language query processing system selects a natural language query processing method using the results from the knowledge base 170. The metareasoner 160 may optionally take into consideration additional factors 635 such as the current computational load. The multi-tiered natural language query processing system invokes the selected language query processing method to process the natural language query at step 640. The results of the invocation 645 may be kept for later use.

At step 650, the metareasoner 160 of the multi-tiered natural language query processing system determines if the current cumulative results are acceptable, if there are insufficient resources for further evaluation, or if all the different processing methods have been invoked. If the current cumulative results are acceptable, there are not sufficient resources for additional processing, or if all the different processing methods have been invoked, then the multi-tiered natural language query processing system returns the current results at step 690. The resources examined may be time or computational resources.

Referring back to step 650, if the cumulative results are insufficient and there are enough resources for additional processing, then the multi-tiered natural language query processing system returns to step 630 to selection another natural language query processing method to invoked. At step 630, the metareasoner 160 selects another natural language query processing method using a number of different data sources that may include the results from the metareasoning knowledge base 170, the additional factors 635, and the results 645 from previous invocations. The system proceeds through steps 630, 640, and 650 until desired results are achieved, insufficient resources are available, or all the different natural language query resolution methods have been invoked. After completion, the results are returned at step 690.

Example Of Metareasoner Workflow

An example of how the present invention handles various sample natural language queries will aid in demonstrating the teachings of the invention. Consider the following natural language queries:

Query 1. "How do I get paid to surf the web?"

Query 2. "Get money to surf the web?"

Query 3. "I need to make some money. Your site looks very interesting to me. Flow do I get paid if I want to surf the Internet?"

Assume an embodiment of the present invention in which the metareasoner employs a dynamic ordering of query resolution methods as illustrated in FIG. 6. Furthermore, assume an embodiment in which there are four query resolution methods, as illustrated in FIG. 1: a parse tree based grammar method 151, a Bayesian network method 153, an annotated term search engine method 155, and an all term search engine method 157.

At the time the query arrives at the application server 130, the metareasoner 160 consults the metareasoning knowledge base 170. Using information from the metareasoning knowledge base 170, the metareasoner 160 determines that there are computational resources available to evaluate the query using the grammar based natural language query processing method 151 and that the query is appropriate to evaluate against the parse tree knowledge base 152. If the invention contains a grammar as depicted in FIG. 2B, then Query 1 will match the parse tree, and ActionTag1 will be returned.

Under the same initial conditions, Query 2 will not match the parse tree generated by the grammar in FIG. 2B. Assuming that computational resources are not constrained, the metareasoner 160 invokes the remaining query resolution method with the highest expected precision, the Bayesian network 153. The Bayesian network depicted in FIG. 3 will return ActionTag1, when presented with the query features "paid", "surf", and "web".

Consider Query 3 in a situation in which computational resources are constrained. For example, multiple queries can be queued in the application server 130, awaiting evaluation. The metareasoner 160 uses a heuristic from the heuristics module 172 that indicates that if the query is long and contains a period then the grammar based natural language query resolution method 151 should be skipped. This heuristic, combined with the existing resource constraints, dictate to the metareasoner to invoke the annotated term search engine 155. Any number of methods can be used to codify this logic, such as a rule engine. Methods for symbolic reasoning using a rule engine are well known, and can be found in a variety of introductory books on artificial intelligence, such as "Rule-based Expert Systems" by Bruce Buchanan and Edward Shortliffe. The annotated terms from Query 3 are "money", "paid," "surf", and "internet." These terms are used as input to the search engine 155. The search engine returns a number of tags, including ActionTag1.

Refinement of the Knowledge Specification Using Machine Learning

The present invention includes methods for refining automatically the single main knowledge specification 180 as the invention handles more natural language queries. In a preferred embodiment, the present invention modifies the probabilities in the single main knowledge specification 180 using techniques for learning Bayesian networks. In one embodiment, both the single main knowledge specification 180 and the Bayesian network knowledge based 154 are modified simultaneously.

For example, if the present invention continually receives the query "How do I get reimbursed to surf the web?". The following probabilities will increase:

P(<paid>="reimbursed"|<get paid1>="get <paid>")

P(<get paid1>="get <paid>"|<get_paid>=present)

P(<get_paid>=present|<How_do_I_get_paid_to_surf_the_web>=present).

Any number of methods can be used to refine probabilities in the single main knowledge specification 180 and the corresponding knowledge base for the Bayesian network method 153. For example, D. Heckerman, D. Geiger and D. M. Chickering, "Learning Bayesian Networks: The Combination of Knowledge and Statistical Data." Proc. 10th Conf. Uncertainty in Artificial Intelligence, Morgan Kaufmann Publishers, San Francisco, Calif., 1994, pp. 293–301.

Use of Partial Results

One embodiment of the present invention uses results computed in one natural language query resolution method as inputs into subsequently invoked natural language query resolution methods. Specifically, referring to FIG. 1, the metareasoner 160 may invoke a first natural language query resolution method and then store the results from that first natural language query resolution method in partial results 177. Then, the metareasoner 160 may subsequently invoke additional natural language query resolution methods and provide the partial results 177 as input parameters to help those subsequent natural language query resolution methods.

Under certain conditions, the parse tree based grammar query resolution method 151 is invoked by the metareasoner 160. If the parse tree based grammar query resolution method 151 fails to return a parse of the complete natural language query, it can return one or more parses of part of the natural language query. For example, the expansion of the <to_surf_the_web>appearing in FIG. 3 can be changed to:

<to_surf_the_web>= to /0.9/<surf><article>/0.8/
    <web>{PartialTag1};

If the incoming query is "Can you tell me how I can get rewarded to surf the Internet?" the modified grammar in FIG. 2B would return PartialTag1. An embodiment of the present invention maintains a list of the associations between partial tags and nodes in the Bayesian network. In this example, PartialTag1 corresponds to the node in FIG. 3 labeled "<to_surf_the_web>. Thus, the invention can set the value of this node to present. The invention also recognizes which parts of the natural language query correspond to the partial result.

In this example, the parse tree based grammar query resolution method 151 returns PartialTagI and the portion of the natural language query that matched the partial result, namely "get rewarded to surf the Internet". The metareasoner 160 stores this information in the Partial results knowledge base 177. When the metareasoner 160 calls the Bayesian network method 153, the metareasoner 160 passes the string "Can you tell me how I can" and the partial result PartialTag1 to the network.

Use of partial results in this fashion increases the precision of the method using the partial result. For example, setting the node "<to_surf_the_web>" to present will increase the probability of <How_do_I_get_paid_to_surf_the_web>more than setting the nodes "surf" and "web" to present.

An embodiment of the present invention passes partial results obtained from the parse tree based grammar query resolution method 151 to the search engine based methods 155 and 157. The phrases associated with the partial results tag that are stored in the partial results knowledge base 177 are sent to the search engines 155 and 157 along with the portion of the natural language query that was not associated with partial result. In the previous example, if the metareasoner 160 invokes the annotated term search engine 155 after invoking the parse tree, the metareasoner 160 sends the string Can you tell me how I can" and the string "get rewarded to surf the internet" to the parse engine. Note that the second string is intended to be sent to the search engine as a quoted string. In an embodiment of the present invention, the search engine will use the quoted string to search for an exact match of the quoted string, thereby increasing the precision of the search.

The foregoing disclosure has described a multi-tiered natural language query resolution system. It is contemplated that changes and modifications may be made by one of ordinary skill in the art, to the materials and arrangements of elements of the present invention without departing from the scope of the invention.

We claim:

1. A computer implemented method of processing natural language queries, said method comprising:

invoking a metareasoning module to obtain a set of expected result metrics for a plurality of different natural language query resolution methods, each of said different natural language query resolution methods capable of returning a final natural language query result;

selecting a natural language query resolution method from said plurality of different natural language query resolution methods dependent on said set of expected result metrics for said plurality of different natural language query resolution methods; and invoking said selected natural language query resolution method to obtain actual natural language query results.

2. The method of processing natural language queries as claimed in claim 1 further comprising:

returning at least one tag or pointer to a section of an information corpus from said actual natural language query results.

3. The method of processing natural language queries as claimed in claim 1 wherein selecting a natural language query resolution method is further dependent upon additional factors.

4. The method of processing natural language queries as claimed in claim 3 wherein one of said additional factors comprises a current load.

5. The method of processing natural language queries as claimed in claim 1 wherein said method repeats selecting said natural language query resolution method and invoking said selected natural language query resolution method until a set of desired natural language query results are fulfilled by said actual natural language query results.

6. The method of processing natural language queries as claimed in claim 1, said method further comprising:
analyzing said actual natural language query results;
selecting a next natural language query resolution method dependent on said actual natural language query results from at least one previous natural language query resolution method.

7. The method of processing natural language queries as claimed in 6 wherein said method repeats selecting said natural language query resolution method dependent on said set of expected result metrics and invoking said selected natural language query resolution method until a set of desired natural language query results are fulfilled by said actual natural language query results.

8. The method of processing natural language queries as claimed in claim 6 wherein selecting said next natural language query resolution method is further dependent upon additional factors.

9. The method of processing natural language queries as claimed in claim 8 wherein one of said additional factors comprises a current load.

10. The method of processing natural language queries as claimed in claim 1, said method further comprising:
selecting a next natural language query resolution method from said plurality of different natural language query resolution methods; and
invoking said next natural language query resolution method wherein said next natural language query resolution method is provided with a set of partial results from said previous selected natural language method.

11. The method of processing natural language queries as claimed in claim 1 wherein said method further comprises:
adjusting a Bayesian network knowledge base used by a natural language query resolution method after a natural language query has been processed.

12. A computer implemented method of processing a natural language queries, said method comprising:
invoking a first natural language query resolution method from a plurality of different natural language query resolution methods to obtain partial results, each of said different natural language query resolution methods in said plurality of different natural language query resolution methods capable of returning a final natural language query result; and
invoking a next natural language query resolution method from said plurality of different natural language query resolution methods using said partial results from said first natural language query resolution method.

13. The method of processing natural language queries as claimed in claim 12 further comprising:
invoking a metareasoning module to obtain a set of expected result metrics for a plurality of natural language query resolution methods; and
selecting said first natural language query resolution method from a plurality of natural language query resolution methods dependent on said set of expected result metrics.

14. The method as claimed in claim 13 wherein selecting said natural language query resolution method is further dependent upon additional factors.

15. The method a s claimed in claim 12 further comprising:
analyzing said partial results;
selecting said next natural language query resolution method dependent on said partial results from said first natural language query resolution method.

16. A computer implemented natural language processing system for processing a natural language query, said natural language processing system comprising:
a single main knowledge representation;
a first natural language query resolution method for analyzing said natural language query, said first natural language query resolution method capable of returning a first final natural language query result;
a first knowledge base for said first natural language query resolution method, said first knowledge base derived from said single main knowledge representation;
a second natural language query resolution method for analyzing said natural language query, said second natural language query resolution method using a second knowledge base;
a second knowledge base for said second natural language query resolution method, said second knowledge base derived from said single main knowledge representation, said second natural language query resolution method capable of returning a second final natural language query result; and
a metareasoner for invoking said first or second natural language query resolution methods based upon expected result metrics.

17. The natural language processing system as claimed in claim 16 wherein said single main knowledge base comprises a set of patterns and an expansion of said set of patterns.

18. The natural language processing system as claimed in claim 17 further comprising:
a derivation system, said derivation system generating an uncertainty based reasoning system based upon said set of patterns and said expansion of said set of patterns.

19. The natural language processing system as claimed in claim 16 wherein said single main knowledge base comprises a grammar.

20. The natural language processing system as claimed in claim 19 wherein said first natural language query resolution method comprises a grammar based method and said first knowledge base comprises a parse tree derived from said regular grammar.

21. The natural language processing system as claimed in claim 19 wherein said first natural language query resolution method comprises a Bayesian network based method and said first knowledge base comprises a Bayesian network derived from said regular grammar.

22. The system as claimed in claim 16 further comprising:
a refinement system, said refinement system improving said single main knowledge representation based upon results from a final result from a natural language query.

23. A computer implemented method of processing natural language queries, said method comprising:
- consulting a metareasoning knowledge base to compare expected metrics for a plurality of natural language query resolution methods, each of said different natural language query resolution methods in said plurality of different natural language query resolution methods capable of returning a final natural language query result;
- selecting a natural language query resolution method from said plurality of natural language query resolution methods dependent on information from said metareasoning knowledge base; and
- invoking said selected natural language query resolution method to obtain actual results.

24. The method of processing natural language queries as claimed in claim 22 wherein said expected metrics comprise expected recall value.

25. The method of processing natural language queries as claimed in claim 23 wherein said expected metrics comprise expected precision value.

26. The method of processing natural language queries as claimed in claim 25 wherein said method successively invokes natural language query resolution methods in an order of decreasing precision values.

* * * * *